UNITED STATES PATENT OFFICE.

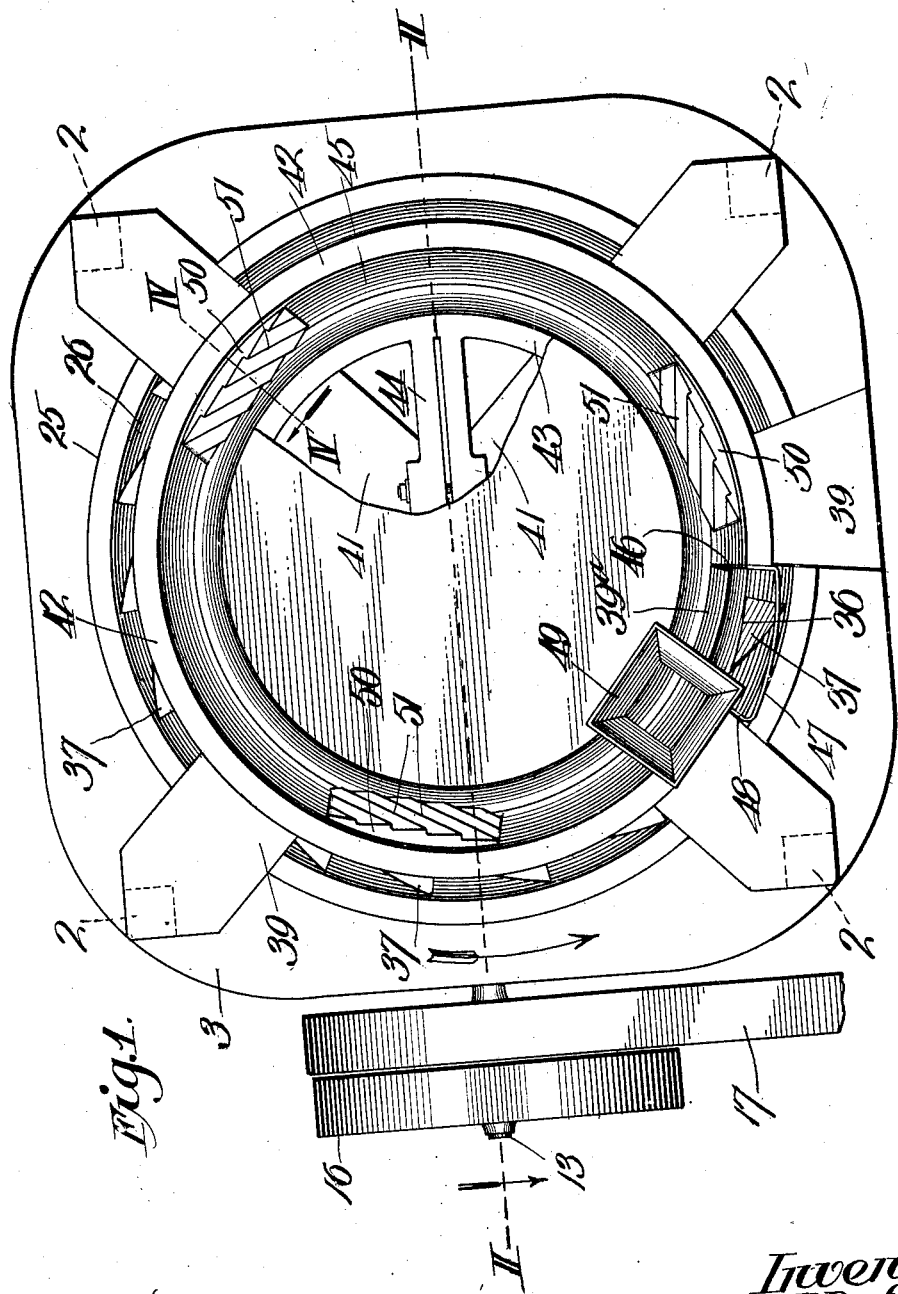

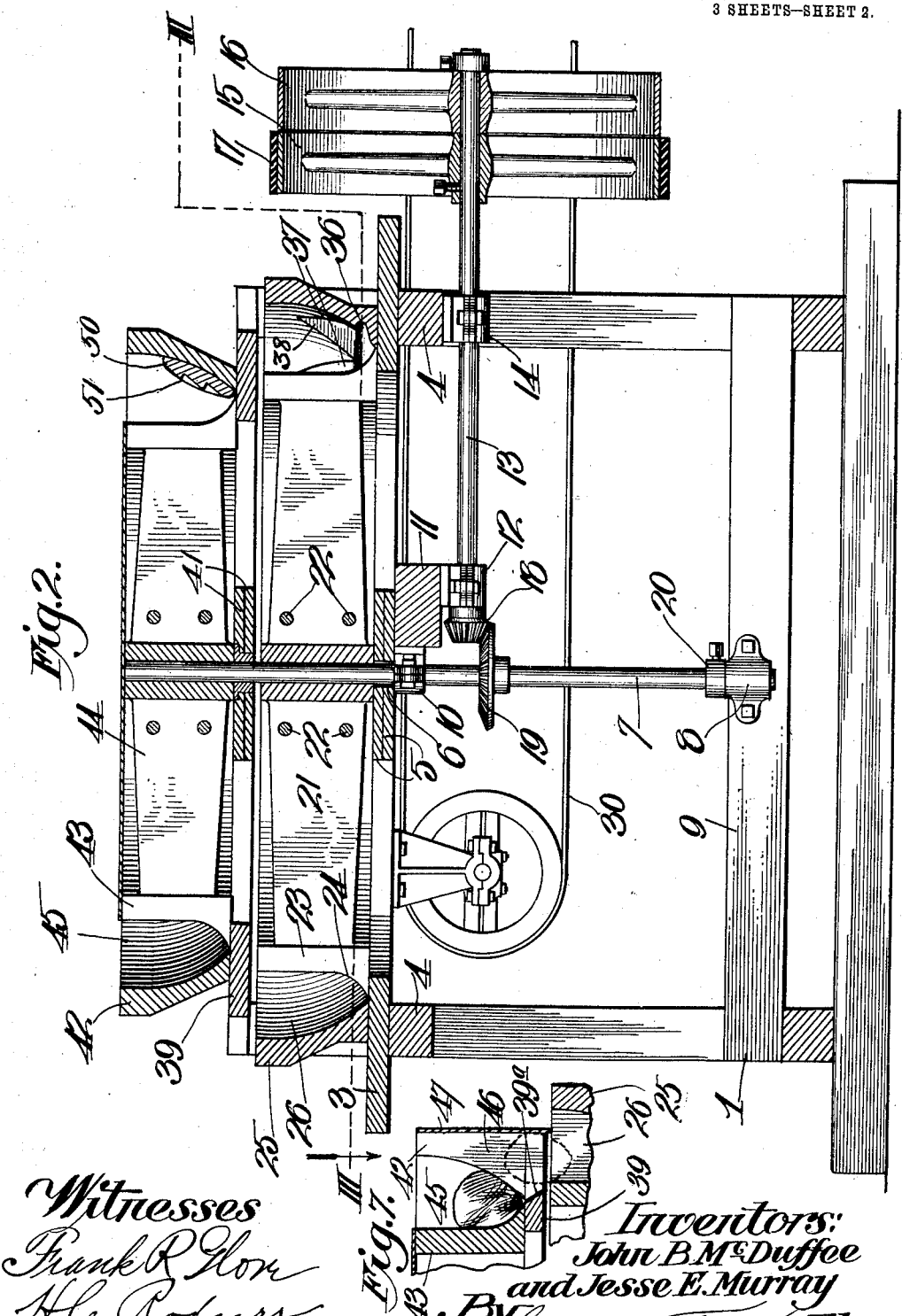

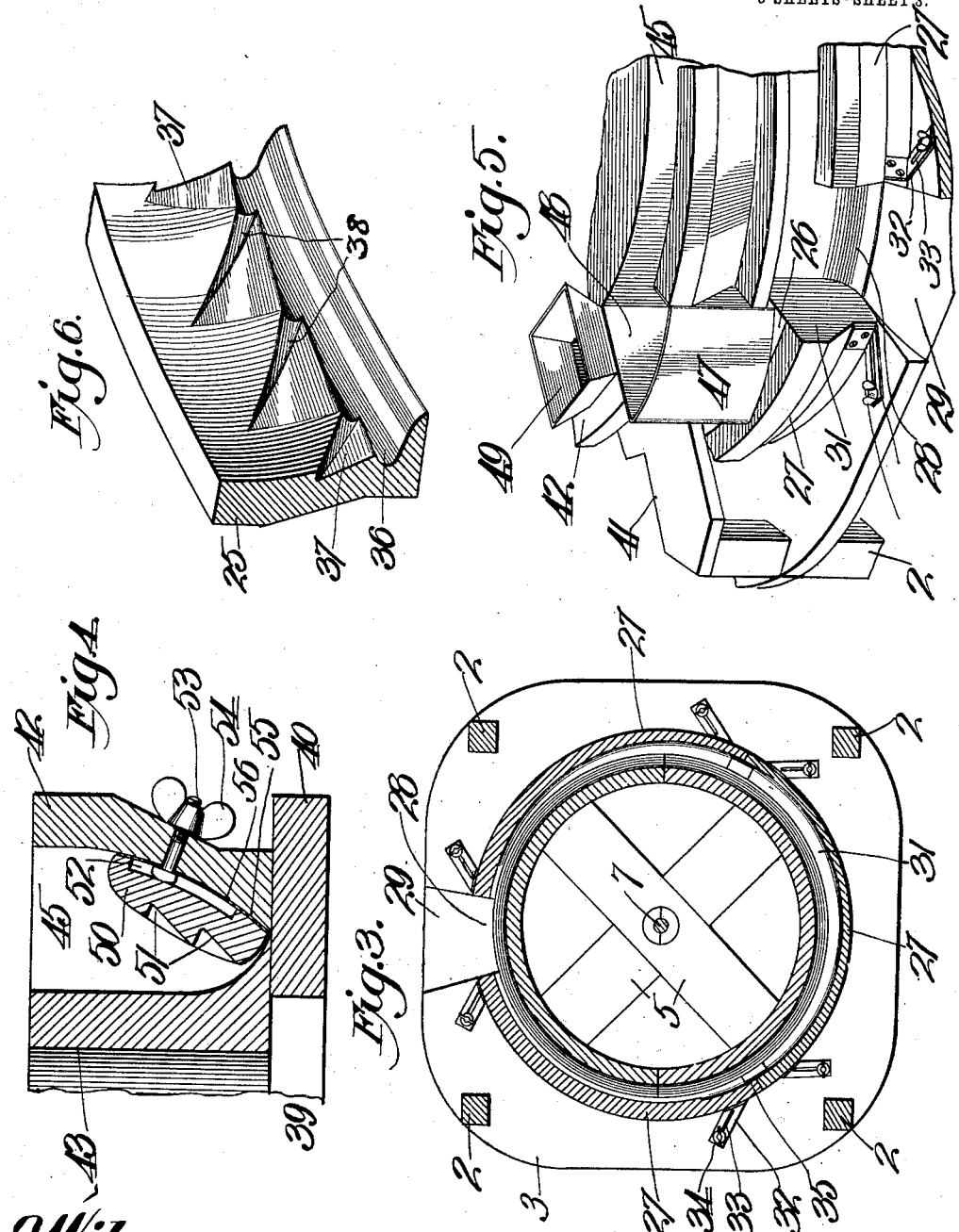

UNITED STATES PATENT OFFICE.

JOHN B. McDUFFEE AND JESSE E. MURRAY, OF KANSAS CITY, MISSOURI, ASSIGNORS OF ONE-THIRD TO HARRY E. SMITH, OF KANSAS CITY, MISSOURI.

LOAF-MOLDING MACHINE.

1,005,264. Specification of Letters Patent. Patented Oct. 10, 1911.

Application filed April 8, 1911. Serial No. 620,170.

*To all whom it may concern:*

Be it known that we, JOHN B. McDUFFEE and JESSE E. MURRAY, citizens of the United States, residing at Kansas City, in the county of Jackson and State of Missouri, have invented certain new and useful Improvements in Loaf-Molding Machines, of which the following is a specification.

This invention relates to loaf molding machines and our object is to produce a machine which will efficiently and reliably "work" and mold loaves of dough to the requisite degree and form.

A further object is to produce a machine of the character described of simple, strong, durable and comparatively inexpensive construction.

With these objects in view the invention consists in certain novel and peculiar features of construction and organization as hereinafter described and claimed; and in order that it may be fully understood reference is to be had to the accompanying drawings, in which—

Figure 1, is a plan view of a loaf-molding machine embodying our invention. Fig. 2, is a central vertical section on the line II—II of Fig. 1. Fig. 3, is a horizontal section on a reduced scale, on the line III—III of Fig. 2. Fig. 4, is an enlarged vertical section on the line IV—IV of Fig. 1. Fig. 5, is a perspective view of a part of the machine. Fig. 6, is an enlarged fragmentary perspective view of a part of the machine. Fig. 7, is a vertical section showing the portions of the two conveyers at the point where the dough loaf being molded falls from one into the other.

In the said drawings, 1 is a skeleton frame embodying four legs 2, extending up through a table 3, certain of the legs being connected together by cross pieces 4, to support the table. Secured to the table at its inner edge in any suitable manner, are diagonal crossed braces 5, stepped together at their crossing points as indicated in Fig. 2, and provided centrally with a vertical opening 6, to accommodate a vertical shaft 7, journaled at its lower end in a bearing 8 secured to cross piece 9. Said shaft is also journaled below the crossed braces of the table in a bearing 10, secured to a suitable block 11, carried by and below the crossed braces.

Journaled in a bearing 12 depending from block 11 is a horizontal shaft 13, journaled also in the bearing 14 depending from one of the cross pieces 4, and secured on the outer end of said shaft are fast and loose pulleys 15 and 16, adapted for alternate engagement by a drive belt 17. Secured on the inner end of shaft 13 is a bevel pinion 18, meshing with a bevel gear 19 on shaft 7, and the latter is prevented from sliding downward by a collar 20 resting on bearing 8.

Secured rigidly on shaft 7, above the table is a horizontally arranged wheel, which preferably consists of two half-wheels 21 clamped together and upon the shaft by bolts 22, and the rim 23 of said wheel is increased in thickness at its lower end, the outer surface of said thickened portion curving downwardly and outwardly at 24. Concentrically surrounding the wheel and secured rigidly upon the table in any suitable manner, is a ring 25, which diminishes in diameter toward its lower end, and which at the inner edge of such end is approximately in contact with the lower outer edge of the wheel. The wheel and ring form the interposed circular trough 26 of substantially V-form in cross section. The ring consists by preference, of three segments 27, one of which is interposed between and abuts endwise against the other segments, which are spaced apart at their opposite ends to provide a discharge opening 28, and to facilitate the discharge of molded loaves of dough through said opening, the table in the plane of said opening is beveled downwardly and outwardly at 29, to direct the loaves from said downwardly sloping portion onto a suitable belt conveyer 30, provided to carry the loaves to the point desired, it being noticed that one end of the circular trough is closed by a wall 31, to insure the ejection of the molded loaves when they reach the said discharge opening 28.

To accommodate loaves of different sizes, the segments 27 are each carried by a pair of parallel angle brackets 32 mounted upon the table and provided with longitudinal slots 33, engaged by clamping bolts 34 carried by the table, and the upper ends of the segments are overlapped at their inner sides by plates 35, which move with a segment and are adapted to bridge the space between the adjacent ends of the segments when the ring is expanded for the purpose of accommodating large loaves.

The ring is provided near its lower edge and at its inner side with a horizontal groove 36, which in length approximately corresponds to the length of two of the segments, and the inner faces of the segments provided with grooves are serrated as shown most clearly in Fig. 6, the serrations 37, opening at their lower ends into the said groove and tapering upward therefrom at a suitable distance, and such serrations extend obliquely and increase in depth diagonally downward or toward the groove so as to form substantially abrupt inclined shoulders 38, which increase in width toward their lower ends and tend to grip and crowd the loaves downward toward the bottom of the trough and into said groove where the loaves are pinched and kneaded, the engagement of the successive shoulders tending to crowd the dough downward and also to twist and turn the same so that it shall be thoroughly "worked" over its entire surface by the time it reaches the discharge opening 28.

Arranged above the trough described, which is the finishing trough, is a circular table 39, consisting of a plurality of segments 40, and crossed bars 41, the bars projecting upward beyond the segments and being secured upon the upper ends of the legs 2 of the frame. Secured upon the table 39 is a ring 42 of smaller size but otherwise corresponding approximately in form to the ring 25, and arranged in concentric relation thereto, and concentrically within said ring 42 is a horizontal wheel 43, corresponding in form to but smaller in size than the wheel 21 and like the latter, it is preferably composed of two sections or halves 44, bolted together and upon the upper end of shaft 7, so as to turn therewith, the said wheel resting at its outer edge upon the table 39 and forming in conjunction with the ring 42, a circular trough 45.

At a suitable point, viz., to the left of the discharge opening and therefore over what may be termed the front end of trough 36, the ring 42 is cut away so as to form a discharge opening 46, and connecting the cutaway ends is a substantially U-shaped plate 47, one arm 48 of said plate acting to arrest the travel of the loaves in trough 45, and the outer or bridge portion of said plate tending to compel the loaves when arrested to drop downward into the front end of the underlying trough 26, see Figs. 1, 5, and 7, it being noted by reference to said Fig. 7, that table 39 is also cut-away to provide an opening 39ª through which the loaf must pass to enter the underlying trough 26. In this connection it will be noted that the loaf in traveling through the trough 45, was revolved around its own axis in the same general direction and that by compelling it to move outward substantially at right angles to its direction of travel in the trough 45, and drop into the underlying trough, it makes about a half turn so that its subsequent revolutions while traveling through the trough 26, is at right angles approximately to that which occurred in trough 45. As a result the loaves are as effectually "worked" as though the operation was performed by hand, it having been found that indefinite working involving turning in the same direction is ineffective to properly "work" the dough.

The loaves are fed in any suitable manner into trough 45, preferably through a hopper 49, bearing a fixed relation to the ring 42, and plate 47, and in order to effectively knead or work the loaves in traveling through said trough 45, the latter is provided at suitable intervals with serrated guides 50, the serrations 51 being preferably of ratchet tooth form and arranged obliquely for the purpose of crowding the loaves of dough toward the wheel 43 and downward toward the bottom of the trough, it being understood that in both troughs the wheels compel the loaves to travel and also through the coöperation by the guides, compel them to twist or rotate so as to be efficiently worked over their entire surfaces.

To widen or narrow the trough 45 for the purpose of accommodating large or small loaves of dough, each guide is provided with a pair of slots 52 extending generally in an upward direction (one only appearing) receiving the headed ends of bolts 53 extending outward through the ring 42, and engaged by clamping nuts 54 bearing against the outer side of the ring, the slots 52 being bridged by plates 55 formed with slots 56 which register with but are narrower than slots 52, so that when the nuts 54 are screwed home the heads of the bolts will clamp the plates 55 immovably against the inner face of the ring and thus secure the guides in trough 45 at the desired altitude.

In operation loaves of dough are successively dropped by hand or otherwise through the hopper 49, into what may be termed the front end of the groove 45, in which they are conveyed in the direction indicated by the arrow Fig. 1, by the frictional contact of the rotating wheel 43, the downwardly tapering form of the trough tending to crowd the loaves toward the bottom thereof for the purpose of properly working them and "rounding them up" the working being made more effectual and thorough as they successively encounter and are forced downward by the guides 50. The loaves successively drop through the opening 46 into the front end of the underlying trough 26 wherein they are carried around by the frictional engagement of the wheel 23, and in such travel they are more thoroughly worked and rounded up by being crowded downward by the serrated surfaces 37 and within the grooves 36. As they complete the circuit of the trough 26, they drop upon the deflecting portion 29 of the table and fall thence onto the conveyer 30 as hereinbefore explained.

From the above description it will be apparent that we have produced a loaf molding machine possessing the features of advantage enumerated as desirable, and we wish it to be understood that while we have illustrated and described the preferred embodiment of the invention, we do not desire to be restricted to the exact details of construction shown and described as obvious modifications will suggest themselves to one skilled in the art.

We claim:—

1. In a loaf molding machine, a table provided with a notch in its outer edge, a circular trough resting upon said table and consisting of an outer wall provided with an opening communicating with the notch in the table, and an inner wheel inward of said notch and sloping downward and outward at its lower edge to the inner edge of said notch, a second trough comprising a ring and a wheel arranged in concentric relation, the inner part of said second trough underlying the table and the upper end of the outer wall of said second trough occupying a plane outward of the outer wall of the first-named trough, a substantially upright plate bridging the opening in the outer wall of the first-named trough and overlying said second trough, and a plate fixed with relation to said bridging plate and constituting a partition for the first-named trough at one side of the opening in the outer wall thereof to insure the arrest and fall of each dough loaf from the first-named trough through the notch of the table into said second trough.

2. In a loaf molding machine, a stationary ring and a rotatable wheel arranged in concentric relation to constitute a trough diminishing in width toward its bottom, the trough being provided internally at one side with one or more serrations extending obliquely for the purpose of crowding a dough loaf moved around within the trough by the rotatable wheel thereof, downwardly toward the bottom of the trough and also having an opening on one side through which said loaf is adapted to be discharged.

3. In a loaf molding machine, a table, a stationary ring and a rotatable wheel arranged in concentric relation to constitute a trough above the table, which diminishes in width toward its bottom, the said ring having a discharge opening, the trough being provided at one side with serrations extending obliquely and adapted to crowd a dough loaf downwardly as it is forced through the trough by the rotatable wheel.

4. In a loaf molding machine, a table, a stationary ring and a rotatable wheel arranged in concentric relation to constitute a trough above the table, which diminishes in width toward its bottom, the said ring having a discharge opening, the trough being provided at one side and near its bottom with a substantially horizontal groove, wherein each dough loaf is adapted to be crowded or pinched to more effectually "work" the same as it is forced around in the trough by the rotatable wheel.

5. In a loaf molding machine, a table, a stationary ring and a rotatable wheel arranged in concentric relation to constitute a trough above the table, which diminishes in width toward its bottom, the said ring having a discharge opening, the trough being provided at one side and near its bottom with a substantially horizontal groove, and with obliquely extending serrations opening at their lower ends into said groove for the purpose of crowding each dough loaf as it is forced around in the trough by said wheel, downward and into said groove.

6. In a loaf molding machine, a table, a stationary ring and a rotatable wheel arranged in concentric relation to form a trough above the table which diminishes in width toward its bottom, and blocks within the trough and adjustable upwardly and downwardly and fitting flatly against one of the walls thereof and having their inner faces provided with obliquely extending serrations tending to crowd each dough loaf as it is forced past the blocks, downward toward the bottom of the trough.

7. In a loaf molding machine, a table, a stationary ring and a rotatable wheel arranged in concentric relation to form a trough above the table which diminishes in width toward its bottom, and blocks within the trough and adjustable upwardly and downwardly and fitting flatly against one of the walls thereof and having their inner faces provided with obliquely extending serrations tending to crowd each dough loaf as it is forced past the blocks downward toward the bottom of the trough; the ring being provided at a suitable point with a discharge opening in its outer wall through which each loaf is adapted to fall.

8. In a loaf molding machine, a stationary ring and a rotatable wheel arranged in concentric relation to form a circular trough diminishing in width toward its bottom, a block within the trough and adjustable upwardly and downwardly and fitting flatly against the inner side of the wheel of the trough and having its inner face provided with one or more obliquely extending serrations whereby each dough loaf as it is forced past the block in its travel through the trough, is crowded downward toward the bottom of the same, one of the walls of the trough being also provided with an opening through which the loaf is adapted to be discharged.

In testimony whereof we affix our signatures, in the presence of two witnesses.

JOHN B. McDUFFEE.
JESSE E. MURRAY.

Witnesses:
HELEN C. RODGERS,
G. Y. THORPE.

Copies of this patent may be obtained for five cents each, by addressing the "Commissioner of Patents, Washington, D. C."